S. SPENCER.
Harvester.
No. 198,055. Patented Dec. 11, 1877.
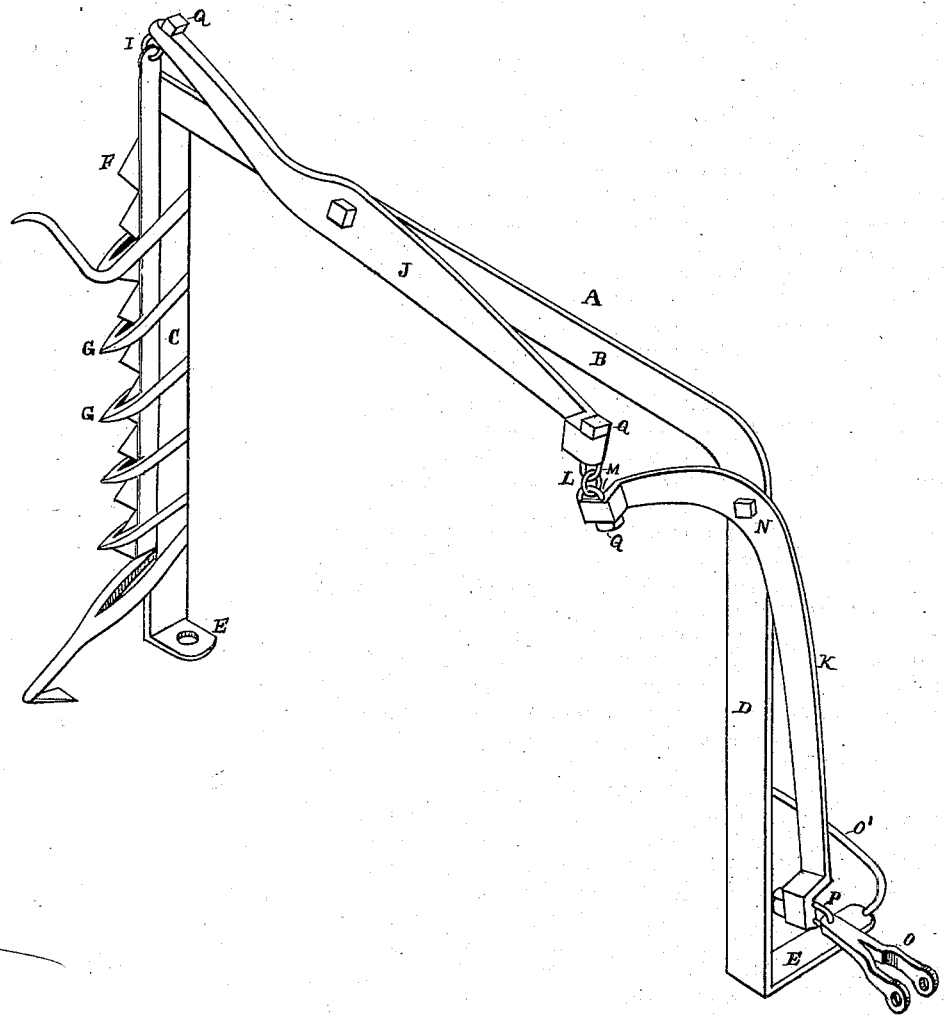
Witnesses
Jno. L. Boone
Frank A. Brooks
Inventor
Samuel Spencer
by Dewey & Co
Attys.

UNITED STATES PATENT OFFICE.

SAMUEL SPENCER, OF TURLOCK, CALIFORNIA.

IMPROVEMENT IN HARVESTERS.

Specification forming part of Letters Patent No. 198,055, dated December 11, 1877; application filed October 4, 1877.

*To all whom it may concern:*

Be it known that I, SAMUEL SPENCER, of Turlock, in the county of Stanislaus and State of California, have invented an Improved Mowing-Machine Attachment, of which the following is a full, clear, and exact description.

My invention relates to a novel device to be used in connection with the ordinary sickle of a mowing-machine, for the purpose of separating the cut from the standing grass, when the machine is working in fallen or tangled grass or grain, and the attachment is operated by the same pitman which operates the mower-sickle.

In mowing tangled grass or grain, especially clover-grass, when only the usual sickle is used, the standing grass or grain being entangled with that which is cut remains matted together, so that no indication is left where the cut grass or grain leaves off and the standing grass or grain begins.

My invention consists of a short upright sickle, attached to the outer end of a yoke-shaped frame, which extends upward and over the ordinary sickle. This upright sickle makes a vertical cut at the outer end of the ordinary sickle, so that the cut grass is completely severed from the standing grass, and the driver of the mowing-machine can always tell where to run the sickle so as to cut standing grass.

Referring to the accompanying drawing, in which Figure 1 is a perspective view, let A represent a frame or yoke, which is made of a thin metallic band or bar. This frame consists of a horizontal cross-piece, B, and two upright standards, C D, and it is secured vertically to the cutter-bar frame of any mowing-machine by bolts passing through feet E on the bottom of each standard, and through the inner and outer shoes of the finger-bar.

The outer standard C of the frame A is so formed that its width is in the direction of the movement of the mower, or at right angles to the cutter-bar. On the front edge of this standard a short upright sickle, F, is held in place by guards or fingers G. This sickle has a vertical reciprocating movement, and is connected with and derives its power from the pitman which drives the ordinary cutter-bar.

The upper end of the supplementary sickle-bar is secured by a joint, I, to the outer end of a lever, J, which is pivoted at a point near the middle to the horizontal cross-piece B of the frame A. The inner end of the lever J is connected with the upper end of a bell-crank lever, K, by a link, L, and a joint, M, on the meeting ends of both levers. This bell-crank lever K is pivoted near the top of the inner upright D at a point, N, and its lower end is connected with the pitman of the ordinary horizontal cutter-bar by a short supplementary pitman, O, by any suitable device.

The connection of the lower end of the bell-crank lever K with this short supplementary pitman O is made with a joint, P. The joints which I have shown are formed so that they may be tightened by a nut, Q, on each, as shown, whenever they may become loose by wear; but any suitable form of joint may be used.

When the mower is in operation, the movement of the pitman, working the lower or horizontal cutter-bar, will be transmitted by the bell-crank lever K and lever J to the upright sickle, which will thus be operated at the same time and in unison with the lower sickle.

The upper finger or guard of the upright sickle is extended and bent upward, preventing the grass or grain from passing above the knives, and the lower finger or guard is bent downward and attached to the point of the shoe, as shown, so as to prevent the grass or grain from passing under the knives. It also forms a brace which stiffens and strengthens the upright C. The inner upright D is also strengthened by a brace, O'.

Any suitable arrangement of levers can be used for transmitting the vibratory motion from the ordinary pitman to the supplemental sickle; but the devices which I have shown are simple and effective.

My invention can be easily and quickly attached to any mowing-machine, and can be made of any height that the grass or grain to be cut may require.

Having thus described my invention, what I claim, and desire to secure by Letters Patent, is—

The mowing-machine attachment, consisting of the two standards C D, connected by the bridge-piece B, and having the feet E E for attachment to the inner and outer ends of the finger-bar, sickle and finger upon the standard C, lever J fulcrumed on the bridge-piece, bell-crank K pivoted to the standard D, and supplemental pitman O, all constructed and arranged substantially as and for the purpose set forth.

In witness whereof I have hereunto set my hand and seal.

SAMUEL SPENCER. [L. S.]

Witnesses:
 J. F. WARD,
 JOHN FOX.